(12) United States Patent
Dürbaum et al.

(10) Patent No.: US 7,190,596 B2
(45) Date of Patent: Mar. 13, 2007

(54) RESONANT CONVERTER WITH PHASE CONTROLLED SWITCHING

(75) Inventors: Thomas Dürbaum, Langerwehe (DE); Georg Sauerländer, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 87 days.

(21) Appl. No.: 10/514,173

(22) PCT Filed: May 9, 2003

(86) PCT No.: PCT/IB03/01814

§ 371 (c)(1),
(2), (4) Date: Nov. 10, 2004

(87) PCT Pub. No.: WO03/098790

PCT Pub. Date: Nov. 27, 2003

(65) Prior Publication Data

US 2005/0226010 A1    Oct. 13, 2005

(30) Foreign Application Priority Data

May 15, 2002   (DE) ............................... 102 21 450

(51) Int. Cl.
*H02M 3/335*    (2006.01)

(52) U.S. Cl. ...................................................... 363/16

(58) Field of Classification Search ................. 363/16, 363/17, 15, 131; 323/235
See application file for complete search history.

(56) References Cited

U.S. PATENT DOCUMENTS

| 5,986,895 | A | 11/1999 | Stewart et al. |
| 6,002,214 | A | 12/1999 | Ribarich |
| 6,301,128 | B1 * | 10/2001 | Jang et al. ..................... 363/17 |
| 6,437,994 | B1 * | 8/2002 | Blom et al. ................... 363/16 |

FOREIGN PATENT DOCUMENTS

| DE | 19925490 | 12/2000 |
| DE | 19925490 A1 | 12/2000 |
| DE | 19961227 A1 | 6/2001 |
| EP | 0430358 | 6/1991 |
| EP | 0430358 A1 | 6/1991 |
| EP | 0948234 A2 | 10/1999 |

* cited by examiner

*Primary Examiner*—Shawn Riley

(57) ABSTRACT

In a switching DC converter with a resonant circuit output stage, the energy remaining in the resonant circuit for switching the switches of the converter in an inductive mode of operation is used to control the phase of switching. The turn-on phase of each switch is controlled to assure zero voltage switching, and the turn-off phase of each switch is controlled to assure that the resonant circuit has sufficient energy to provide this zero voltage switching.

21 Claims, 3 Drawing Sheets

RESONANT CONVERTER WITH PHASE CONTROLLED SWITCHING

The invention relates to a circuit arrangement for a converter with switches for chopping a DC voltage U1 into a chopped DC voltage U3, comprising control means for controlling the switch-on times of the switches, in which switch-on times of the switches alternate with each other and are separated from each other by dead-time phases, and circuit elements comprising a resonant circuit having at least one capacitor and at least one coil for converting the chopped DC voltage U3 into an output voltage U2. The invention also relates to a method of switching the switches in such a circuit arrangement.

Converters with resonant circuit elements, referred to as resonant converters, are generally used for supplying a load connected to its output with a DC voltage or a DC current. They may be used in versatile ways and are particularly used for operating gas discharge lamps, display screens, audio apparatuses, televisions, video recorders or in the automobile technique. Resonant converters may be formed as AC/AC, DC/AC, AC/DC or DC/DC converters.

Within resonant converters of the type described in the opening paragraph, a DC voltage U1 is chopped into a chopped DC voltage U3 by means of a bridge circuit or half bridge circuit consisting of switches. The chopped DC voltage is applied to circuit means having at least one inductive and one capacitive resonant circuit element, i.e. with inductive and capacitive reactance components, such that an AC current flows in the circuit means in the case of operation proximate to the resonance frequency, which DC current is approximately sinusoidal, for example, in circuit means having exactly one inductive and exactly one capacitive resonant circuit element. This AC current is then rectified and smoothed to an output voltage U2 as a power supply voltage for a load connected to the converter. However, other applications are also feasible, in which the load is operated with an AC voltage, thus without any rectifiers, (for example, induction heating). By adapting the switching frequency for the switches, an adaptation to load changes and input voltage fluctuations can be performed.

Resonant converters can be operated at high switching frequencies so that, in comparison with the possible power supply, apparatuses having a small volume and a light weight can be built.

In resonant converters, a so-called ZVS operation (Zero Voltage Switching) is aimed at for reducing the number of components and for avoiding switching losses, for which customarily but not necessarily MOSFETs are used as switches. In this context, ZVS operation is understood to mean switching on of the switches (transferring them to the conducting state) at a minimal switch voltage, preferably near zero volt. To provide the possibility of ZVS operation, dead-time phases should be realized in which all switches of the relevant half bridge are switched off (i.e. in the non-conducting state).

To ensure ZVS operation in different areas of operation of the converter, the dead-time phases should be adapted to the area of operation of the converter. Known control ICs such as, for example, the STR-Z4000 series of the firm of Allegro-Sanken or the controller IC MC 34067 of Motorola do not provide the possibility of automatic adaptation and can therefore ensure ZVS operation only within limited areas. Outside these areas, they can no longer ensure a reliable ZVS operation. When mismatching the dead-time phases and a resultant elimination of the ZVS operation, the switching losses are increased, which may lead to destruction of the switches in extreme cases.

To avoid such switching losses, the switching of the switches at a capacitive load is to be particularly avoided. To avoid the switching at a capacitive load, i.e. in the capacitive mode of operation, it is known to provide means for determining the type of converter load (inductive or capacitive) so as to prevent the switching-on of the element to be switched in the case of a capacitive load.

A converter circuit arrangement of the type described in the opening paragraph is known from EP 0 430 358 A1. To avoid switching at a capacitive load, the phase difference between the voltage applied to the circuitry and the current flowing in the circuit arrangement is indirectly monitored by monitoring the current flowing in the circuitry. In this mode of determining the converter load, it is detrimental that the phase difference determination is elaborate from a circuit technical point of view and that the measurements are subject to losses.

Furthermore, a circuit arrangement is known from DE 199 25 490 in which the voltage at one of the switches and possibly also the voltage gradient dI/dt is measured for determining the type of converter load in a dead-time phase before switching on, and is compared with a threshold value so as to control the dead times between the switch-on times of the switches. This has the drawback that the operation of the converter at a capacitive load is only determined at the switch-on instant at the end of the dead time and thus not until after the load is already capacitive. In such a case, the switching cycle must be interrupted and re-initiated, which may cause disturbances.

It is therefore an object of the present invention to provide a circuit arrangement of the type described in the opening paragraph in which ZVS operation without any disturbance is possible and which does not have the above-mentioned drawbacks. It is also an object of the invention to provide a method of the type described in the opening paragraph for operating such circuit arrangement.

This object is solved in that means for determining the current I flowing in the resonant circuit are provided, in that the control means comprise a comparator which compares a value dependent on the current I flowing in the resonant circuit with a threshold value, and in that the circuit means control the switching of the switches in dependence upon the comparison result.

Alternatively, or in addition to the above-mentioned solution, the object is also solved in that means for determining the current gradient dI/dt of the current I flowing in the resonant circuit are provided, in that the control means comprise a comparator which compares a value dependent on the current gradient dI/dt with a threshold value, and the circuit means control the switching of the switches in dependence upon the comparison result.

The object is also solved by means of a method of switching the switches of the circuit arrangement according to the invention for a converter, in which:

a value dependent on the current I flowing in the resonant circuit is determined and compared with a threshold value during the switch-on phase of a switch; and the switches can be alternately switched off until the current I has reached the threshold value.

Alternatively, or in addition to this method, the object is also solved by means of a method in which:

a value dependent on the current gradient dI/dt of the current I flowing in the resonant circuit is determined and compared with a threshold value during the switch-on phase of a switch; and the switches can be alternately switched off until the current gradient has reached the threshold value.

An essential fundamental aspect of the invention is that, with the determination of the current I flowing in the resonant circuit and/or the current gradient dI/dt, it is possible at any instant to determine a value for the energy in the resonant circuit or the charge in the inductive mode of operation, and thus to determine at which instant a switch should be switched off at the latest in order that the switch-on process for the subsequent switch is not performed in the capacitive mode of operation. The energy/charge remaining in the inductive mode of operation must be large enough when switching off the switches so as to ensure that the relevant subsequent switch is switched on again in the ZVS operation.

The circuit arrangement according to the invention provides the particular possibility of checking the switch-on release of a subsequent switch already before the start of the dead time and hence before the instantaneously active switch is switched off, so that the reliability of operation of the converter is significantly enhanced.

Optionally, the control means supply a signal at the latest for switching off the active (switched-on) switch, as soon as they have received a signal from the comparator indicating that the given value for the energy/charge remaining in the inductive mode has reached the threshold value, or the subsequent switch is prevented from being switched-on when the comparator has supplied a signal indicating that the value for the energy/charge remaining in the inductive mode of operation has fallen below the threshold value.

It can, inter alia, also be taken into account that a switch is usually not switched on directly at the instant when the switch receives a switch-on signal, but when the switching process has been terminated after a given time delay.

While it has hitherto been possible in circuit arrangements of the state of the art to determine whether an inductive or a capacitive mode of operation is provided before the switches are switched on, and the normal converter operation must be interrupted and a new starting sequence for switching the switches must be introduced in a capacitive mode of operation, the current variation can be monitored in the resonant circuit by means of the circuit arrangements according to the invention and the switches can be timely controlled in such a way that the switches to be switched on are always switched on in the inductive mode of operation. Thus, switching in the capacitive mode of operation can be certainly avoided so that a ZVS operation is permanently ensured. The latter particularly applies when the threshold value is adjusted appropriately. The method may be optionally implemented in such a way that a switch can still be switched on when the current I has reached the first threshold value but has not yet exceeded or fallen below this value, or in such a way that the switch can no longer be switched on when the current I has reached the first threshold value.

When any switch-on of the switches in the capacitive mode is prevented in this way, the use of power MOSFETs can no longer lead to problems in connection with the reverse recovery behavior of anti-parallel power diodes (particularly the often very poor intrinsic body diodes of the power MOSFETs).

The means for measuring the current I and/or the current gradient dI/dt may be arranged in the resonant circuit, at which a measuring point is sufficient. The means should then be suitable for processing both positive and negative measuring values and for forming values for negative measuring values. The means for measuring the current I and/or the current gradient dI/dt may also be provided on the switches of a half bridge or on the switch pairs of a full bridge circuit. In this case, two measuring points are required, for which the means for measuring the current I should then be able to process only positive signals.

Particularly, a resistor or a current transformer as well as current-sense FETs can be used in both cases as means for measuring the current I and/or the current gradient dI/dt.

When MOSFETs are used as switches, the current I and/or the current gradient dI/dt can be comparatively easily tapped via its drain source voltage in a further preferred embodiment of the invention.

As already described above, switch-off of the active switch can be triggered in a preferred embodiment of the method at the latest when the threshold value has been reached so that the switch-on process for the subsequent switch is timely initiated before the energy/charge available for recharging the capacitances falls below the at least required energy/charge in the inductive mode of operation.

In a further preferred embodiment of the method, a switch-on of the subsequent switch can be prevented after the value has fallen below the threshold value, and in each case, a switch-on of a switch can be prevented in the capacitive mode of operation.

The method according to the invention for switching the switches in a circuit arrangement is further preferably implemented in such a way that the threshold value is adjusted in dependence upon the input voltage U1, which is raised with an increasing input voltage U1. Since the required energy/charge for charging or discharging the parasitic and possibly external capacitance in the resonant circuit increases with an increasing input voltage U1, it will thus be possible to adapt the threshold value to the load condition.

These and other aspects of the invention are apparent from and will be elucidated with reference to the embodiments described hereinafter.

Figure 3A:
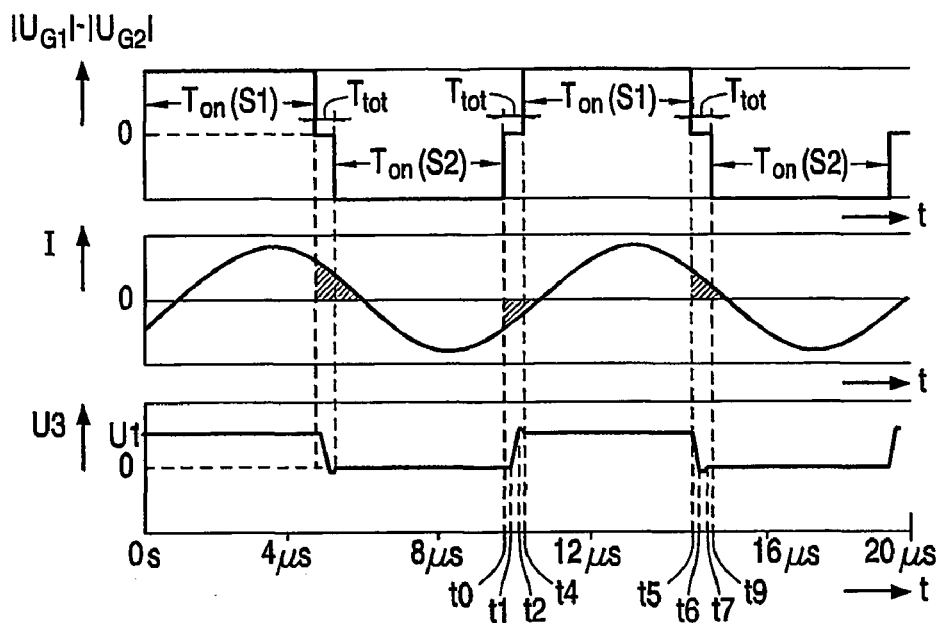
Figure 3B:
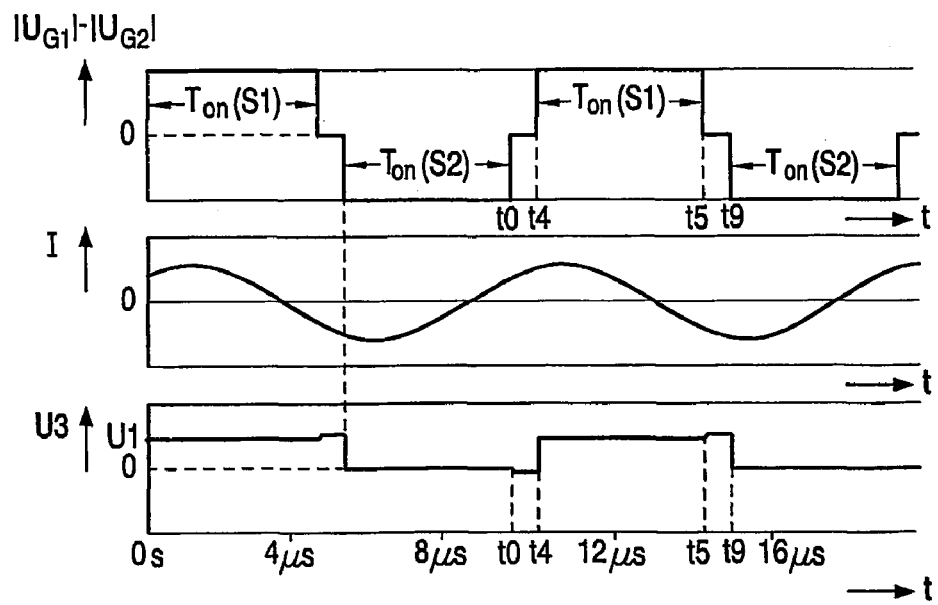
Figure 3C:
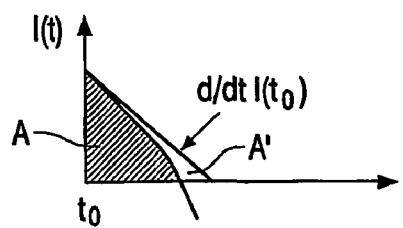
Figure 4:
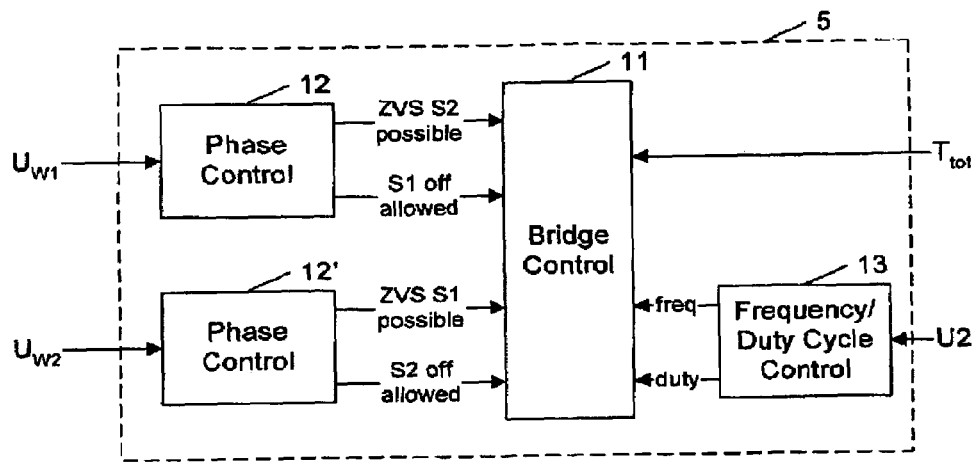
Figure 5:
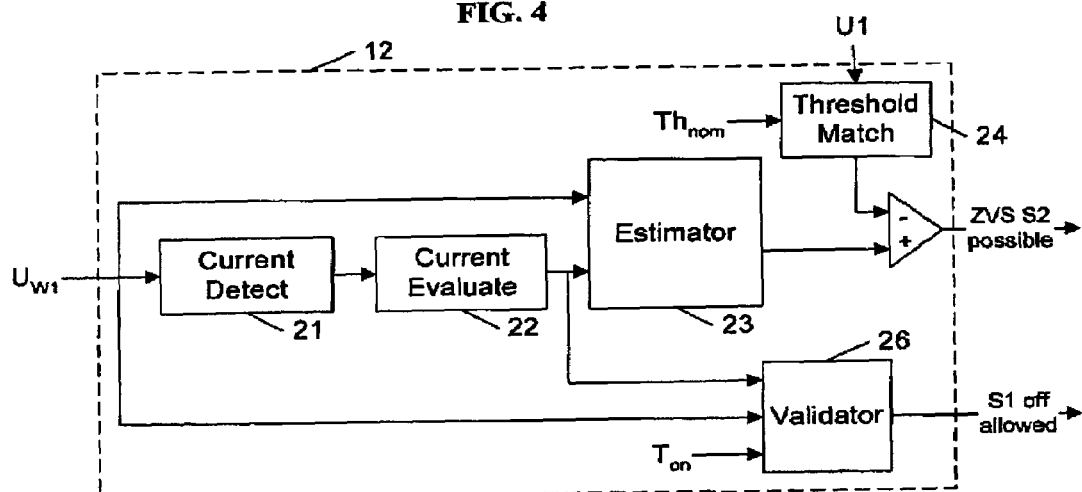

FIG. 3*a* shows time variations for an inductive load;

FIG. 3*b* shows time variations for a capacitive load;

FIG. 3*c* is a diagram for the remaining residual charge as a measure of the remaining energy in the case of an inductive load;

FIG. 4 is a block diagram of a control circuit arrangement for controlling the switches;

FIG. 5 is a block diagram of a control circuit; and

Figure 6:
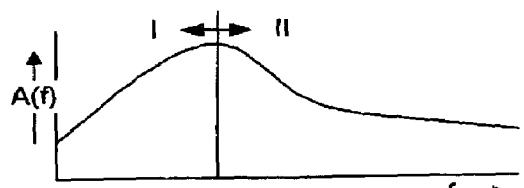

FIG. 6 shows a transfer function as a function of the frequency for a constant load resistance.

Figure 1:
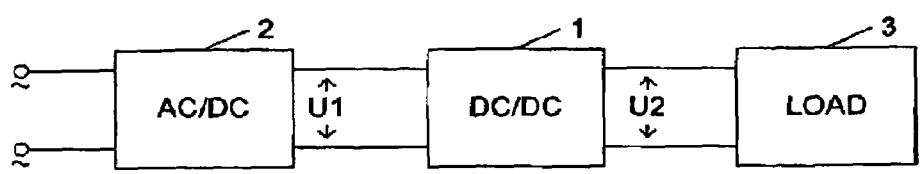
FIG. 1 is a block diagram of a circuit arrangement including a resonant converter.

The block diagram in FIG. 1 shows a load-resonant converter, here a power supply unit, with a circuit block 1 for converting a DC input voltage U1 into an output voltage U2, here a DC voltage, which is used for supplying a load represented by a circuit block 3. The input voltage U1 is generated in the conventional manner for power supply units, for example, by rectifying an AC voltage of an AC voltage mains 4 by means of a circuit block 2.

Figure 2:
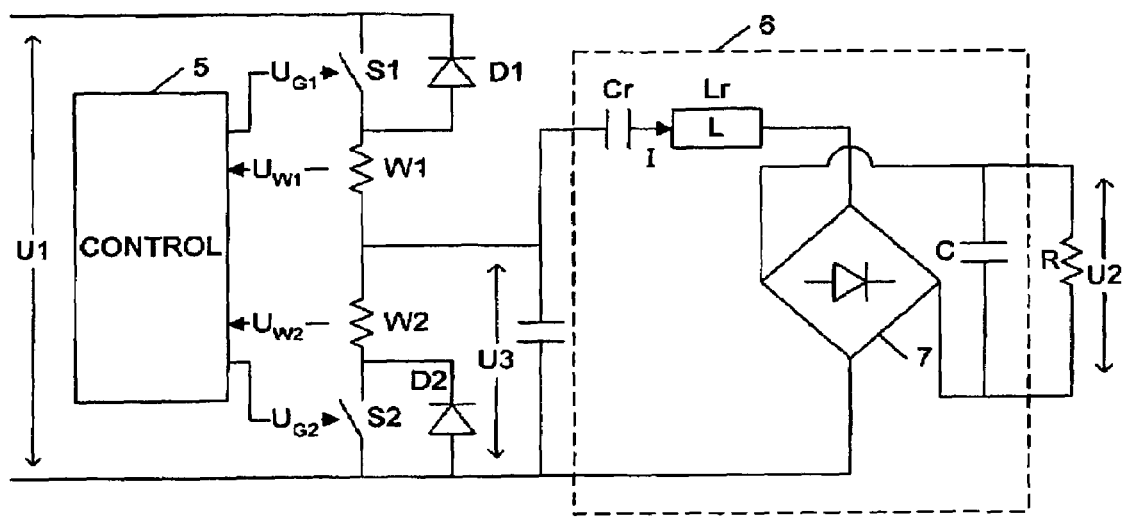
FIG. 2 shows the circuit structure of a resonant converter according to the invention.

FIG. 2 shows in a more detailed way the essential elements of a converter as shown in FIG. 1. The DC input voltage U1 is present at a half bridge of series-arranged switches S1 and S2, which chop the DC voltage U1. The switches S1 and S2 are MOSFET transistors in this case, which comprise body diodes D1 and D2 each being arranged anti-parallel to the corresponding switches S1 and S2.

A capacitance Cp at which a chopped DC voltage U3 decreases during operation of the converter 1 is arranged parallel to the switch S2. The capacitance Cp need not necessarily be an external component but it may be exclusively the output capacitance $C_{iss}$ of the MOSFET transistors, which are present anyway. The chopped DC voltage U3 is applied to a circuit configuration 6, which comprises resonant circuit elements and generates a DC output voltage U2. The circuit configuration 6 comprises a capacitance Cr and an inductance Lr, arranged in series, as resonant circuit elements. Between the series arrangement of the capacitance Cr and the inductance Lr and the capacitance Cp, a rectifier arrangement 7 is arranged in the direction of the converter output, which rectifier arrangement rectifies a current I flowing through the resonant circuit elements Cr and Lr and, as usual, applies it to a smoothing capacitance C arranged at the output, from which smoothing capacitance the DC output voltage U2 can be tapped.

In FIG. 2, the DC output voltage U2 is present at a load R, which is shown as an ohmic resistor in this case. Fundamentally, the converter 1 may, however, also be used for supplying an AC voltage instead of a DC voltage. In such a case, rectification by a rectifier arrangement and a smoothing capacitor is not required and the output voltage would be equal to the AC voltage decreasing at the rectifier arrangement 7 in the embodiment shown in FIG. 2.

A control unit 5 for controlling switching-on and switching-off of the switches S1, S2 is provided. Arranged in series with each of the switches S1, S2 is an ohmic resistor W1, W2 from which the decreasing voltage $U_{W1}$ or $U_{W2}$ is tapped by the control unit 5. Alternatively to these resistors W1 and W2, an ohmic resistor arranged in the resonant circuit may also be used. Instead of ohmic resistors, current transformers or current-sense FETs for determining the current I flowing during a dead-time phase and/or the current gradient dI/dt can be used, whose signals are then tapped accordingly by the control unit 5.

By alternately switching on (transferring to the conductive state) and switching off (transferring to the blocking state) of the switches S1 and S2, the DC input voltage U1 is converted into the chopped DC voltage U3. When the switch S1 is switched on, switch S2 is switched off. When the switch S2 is switched on, switch S1 is switched off. Between the end of a switch-on phase of the switch S1 and the start of a switch-on phase of the switch S2, there is always a dead-time phase in which the two switches S1 and S2 are switched off. Between one end of a switch-on phase of the switch S2 and the start of the next switch-on phase of the switch S1, there is also such a dead-time phase. By providing such dead-time phases, a ZVS operation (Zero Voltage Switching) becomes possible. By adapting the switching frequency, a constant output voltage is also ensured when there are fluctuations of the load and of the input voltage.

The upper one of the three diagrams shown in FIG. 3a represents the difference $|U_{G1}|-|U_{G2}|$ of the value of the control voltage $U_{G1}$ at the switch S1 and the value of the control voltage $U_{G2}$ at the switch S2, namely for the case in the present embodiment where only positive control voltages $U_{G1}$ und $U_{G2}$ are provided. The control voltages $U_{G1}$ and $U_{G2}$ serving as control signals for controlling the switches S1 and S2 represent corresponding gate voltages of the MOSFET transistors. There is a dead-time phase, denoted by $T_{tot}$, whenever the difference between the values of the control voltages is zero.

When the switch S1 is transferred to the switched-on state by applying a suitable control voltage $U_{G1}$ to the control input of the switch, the time intervals denoted by $T_{on}(S1)$ are present. In these time intervals, the control voltage $U_{G2}$ is zero so that the switch S2 is switched off. The time intervals in which the switch S2 is switched on and the switch S1 is switched off are denoted by $T_{on}(S2)$. During these time intervals, a control voltage $U_{G2}$, which is different from zero and causes the switch S2 to switch on is applied to the control input of the switch S2. Within these time intervals, the control voltage $U_{G1}$ is zero.

The central diagram in FIG. 3a shows the variation with respect to time of the current flowing through the resonant circuit elements $C_r$ and $L_r$. Finally, the lower diagram in FIG. 3a shows the variation with respect to time of the voltage U3 present at the parasitic capacitance $C_p$. The time axes of the three diagrams with the time t are plotted on the same scale.

The alternation between the switch-on and switch-off states of the switches S1 and S2 will hereinafter be elucidated in a simplified manner, by way of example, in which states the processes during alternation between the single switching cycli are elucidated. At the instant t0, the control voltage $U_{G2}$ is set to zero so as to cause the switch S2 to be switched off. This leads to a discharge at the gate electrode of the MOSFET transistor used for realizing the switch S2. Until the moment when the value falls below the MOSFET threshold value $U_{th}>0$, the switch S2 is still conducting so that the current I which is negative at this instant still flows through the switch S2. From the instant t1, the switch S2 is finally switched off so that no current can flow through this switch any longer. The current I further flowing due to the energy stored in the inductance L, now causes the capacitance $C_p$ to be charged from the instant t1 so that the voltage U3 increases. At the instant t2, the value U3 has finally reached the value of the DC input voltage U1 so that the diode D1 starts conducting. From this instant, a switch-on of the switch S1 below a switching voltage $U_{S1}$ of about 0 volt (ZVS at the diode forward voltage) is ensured.

A short time after the instant t2, at the instant t4, the switch S1 is switched on by applying a corresponding control voltage $U_{G1}$. A time interval $T_{on}(S1)$ with the switch S1 switched on and the switch S2 switched off is thereby initiated.

At the instant t5, the end of this time interval Ton (S1) is initiated, in which the control voltage $U_{G1}$ is set to zero. This in turn leads to a discharge process at the gate electrode of the MOSFET transistor used for realizing the switch S1. At the instant t6, this discharge process has been terminated to such an extent that the switch S1 starts blocking, i.e. it changes over to the switched-off state so that the current I which is positive at this instant leads to a discharge of the capacitance $C_p$ and hence to a decrease of the voltage U3. At the instant t7, the voltage U3 has reached the value of zero so that, from this instant, the diode D2 starts conducting and the switch S2 can be switched on below a switching voltage $US_2$ of about 0 volt (at the diode forward voltage), which actually happens at the instant t9 a short time after a corresponding control voltage $U_{N2}$ has been applied. A time interval $T_{on}(S2)$ starts from this instant at which the switch S2 is switched on and the switch S1 is switched off.

There is a dead-time phase $T_{tot}$ between the instants t0 and t4 and between the instants t5 and t9, during which dead-time phase both the control voltage $U_{G1}$ and the control voltage UG2 are zero so that control voltages operating as switch-off control signals are provided. The dead-time phases $T_{tot}$ are adjusted in such a way that ZVS operation is possible. In the I(t) diagram, the shaded areas represent a measure of the available charge for recharging the capacitance $C_p$. In the case shown in FIG. 3a, the available charge is present to a sufficient extent.

The state of operation shown by means of the variations with respect to time in FIG. 3a represents, for example, an inductive load, i.e. the current I lags with respect to the first harmonic of the voltage U3. In such a state of operation, ZVS operation of the converter 1 is possible in so far as sufficient inductively stored energy is available for the transfer.

In contrast, FIG. 3b shows, by way of example, corresponding variations with respect to time for a capacitive load. In such a state of operation, the current I leads with respect to the first harmonic of the voltage U3. In the capacitive load, ZVS operation of the converter 1 is no longer possible.

At the instant t0 in FIG. 3b, the switch S2 is switched off. The current I is then positive so that a gradual charging of the capacitance $C_p$ up to the voltage U1 (as in the case shown in FIG. 3a between the instants t1 and t2) is not possible due to the current I which is constantly driven on by the energy stored in the inductance $L_r$, but the current continues to flow instead through the diode D2. In this case, the voltage U3 is abruptly raised from zero to the value U1 at the instant t4 at which the switch S1 is switched on, i.e. the full voltage having the value of U1 is still present at this switch S1 when it is switched on. In a corresponding manner, the switch S2 is not switched on in the voltageless state in the capacitive load, because the voltage U3 still has the value U1 at the instant t9 at which the switch S2 is switched on, which value is abruptly decreased to zero. In the capacitive load, high switching losses are produced (and corresponding large values for the product of the current I and the switch voltages $U_{S1}$ and $U_{S2}$ at the instants t4 and t9, respectively) in the switches S1 and S2 which are here formed as MOSFET transistors, which may even lead to a destruction of the switches. In the present circuit arrangement, switching is certainly avoided in the case of a capacitive load.

FIG. 3c shows diagrammatically a section of the upper diagram of FIG. 3a, representing the dead time after the switch S1 has been switched off. The shaded area is a comparatively good measure of the energy/charge available for ZVS operation. By means of the absolute value of the current as well as its derivation at the instant $t_0$, it can be estimated by means of the following formula:

$$A \approx A' = -I^2(t0)/(2 \cdot d/dt\, I(t0))$$

However, knowing the transfer functions of the resonant circuit elements of the converter 1 and hence knowing the functions I(t) and d/dt I(t), it is also possible to estimate the residual energy/residual charge available for ZVS operation exclusively in dependence upon I and exclusively in dependence upon d/dt I(t), respectively.

FIG. 4 shows a configuration of an embodiment according to the invention for the control unit 5. It comprises a half bridge control 11, two control circuits 12, 12' and a controller 13.

The control unit 5 has its own control circuit 12, 12' for each switch S1, S2, in which the voltage $U_{W1}$ decreasing at the resistor W1 is present at the input of the control circuit 12 and the voltage $U_{W2}$ decreasing at the resistor W2 is present at the input of the control circuit 12'. The control circuits 12 and 12' make the signals "ZVS S2 possible" and "S1 off allowed" or "ZVS S1 possible" and "S2 off allowed" available at their outputs so as to inform the half bridge control whether there is sufficient energy/charge for zero voltage switching of switches S2 and S1, respectively, and whether the switches S2 and S1 can be switched off.

The control circuits 12, 12' thus operate as protective circuits, which ensure a reliable ZVS operation, particularly in the normal mode of operation, after which the load resonant converter has started up. During the starting phase of the resonant converter, this protective circuit should be deactivated, or its signals should not be taken into account by the half bridge control 11 in order that this does not disturb a start-up of the load resonant converter.

In dependence upon the voltage $U_2$ present at its input 1, the controller 13 generates control signals for the required frequency and the duty cycle at which the switches S1, S2 should be switched. These signals are present at the outputs of the controller 13.

In dependence upon the signals of the control circuits 12, 12', the frequency signal and/or the duty cycle signal of the controller 13, as well as upon a regulating value for the instantaneous dead time $T_{tot}$, which are present at the inputs of the half bridge circuit 11, the half bridge circuit 11 generates the control voltages $U_{G1}$ and $U_{B2}$ present at its outputs for the purpose of switching the switches S1 and S2.

The control unit 5 with the control circuits 12 and 12' may be realized in a single IC together with the controller 13 and the half bridge circuit 11, as is shown. It is particularly also possible to realize the control circuits 12 and 12' by means of a single control circuit and then doubly utilizing control circuit parts by multiplexing the voltages $U_{W1}$ and $U_{W2}$. Similarly as the half bridge circuit 11 and the controller 13, the control circuits 12 and 12' may also be realized by means of separate ICs.

FIG. 5 shows the fundamental structure of a preferred embodiment of the control circuit 12 used for controlling the switch S1 in a block diagram, with a functional block 21, 22, an estimation device 23, a threshold matching device 24, a comparator 25 and a circuit block 26.

The functional block 21, 22 incorporates a combined measuring and evaluating device which determines the current I flowing through the switch S1 from the voltage $U_{W1}$ tapped from the resistor W1 and passes on a signal, equivalent to the current I, to an estimation device 23. Additionally, the low-pass filtered current gradient dI/dt can be determined from the voltage $U_{W1}$ tapped from the resistor W1 and a signal equivalent thereto can be passed on to the estimation device 23. The estimation device 23 determines the energy/charge from the input values, which energy/charge is available for recharging the parasitic switch capacitances as well as $C_p$.

The threshold matching circuit 24 generates a signal, which corresponds to the minimal energy/minimal charge required for recharging the parasitic switch capacitances as well as the capacitance $C_p$. To this end, it adapts a nominal value at its input 1 to the input voltage $U_1$, in which the threshold value is raised with an increasing input voltage U1 because the required energy/charge for charging or discharging the parasitic capacitance in the resonant circuit increases with an increasing input voltage U1 and is decreased accordingly when the input voltage U1 decreases. Similarly, the threshold value can be adjusted in dependence upon the switching frequency of the switches S1, S2 and/or in dependence upon the load present at the converter. During operation, the threshold value can thus be adapted to the working point of the converter 1.

The comparator 25 checks whether the value for the energy/charge determined by the estimation device 23 is larger than the threshold value predetermined by the threshold matching circuit 24 so that a zero voltage switch-on of the next switch is possible, in which it generates a logic "one" (corresponds to "ZVS S2 possible") in this case.

Moreover, the input signals which are proportional to the current I and possibly the current gradient dI/dt are applied to the circuit block 26 which performs a validity check and checks whether the switch-off of the instantaneously switched-on switch is principally allowed, and generates a corresponding output signal. Possibly criteria for validity check may be, for example:

Switching S1 off: I>0, dI/dt<0, $T_{on}>T_{min}$, $A>A_{min}$ or a sub-combination of these criteria (in a corresponding manner, the criteria for switching off S2 in a circuit block of a control circuit 12' are: I<0, dI/dt>0, $T_{on}>T_{min}$, $A>A_{min}$ or a sub-combination of these criteria).

Both the absolute value of the current I and the absolute value of the current I in connection with the current gradient dI/dt (and also the current gradient d/dt I(t) when knowing the transfer function of the resonant circuit or its elements, and estimation of the current I correlating with the current gradient d/dt (I(t) by an estimation device) are a measure of the available energy/charge for causing the voltage U3 to increase via charging of the parasitic switch capacitances including $C_p$ to the input voltage U1, which is necessary for switching on the switch S1 in the ZVS operation, and they are also a measure of the available energy/charge for causing the voltage U3 to decrease by complete discharging of the parasitic capacitance $C_p$ to the value of zero which is necessary for switching on the switch S2 in the ZVS operation. The threshold value predetermines a limit at which the available residual energy/residual charge is still reliably sufficient to ensure a switch-over of the switches S1, S2 in the ZVS operation.

By choosing an appropriate nominal value, it can thus always be ensured in a normal state of operation of a converter, after it has "started up", that the voltage U3 required for switching on the switches S1 and S2 in the inductive load is reached. It is therefore no longer necessary, as in the state of the art, to determine whether there is a capacitive or an inductive load, but switching is always performed in the inductive load at which Zero Voltage Switching is ensured without any difficulty at an appropriately selected threshold value.

FIG. 6 shows a transfer function A(f) showing the variation of the quotient U2/U3 in dependence upon the frequency f. At the resonance frequency $f_r$ of the converter 1, which is essentially determined by the capacitance Cr and the inductance Lr, the transfer function A(f) has its maximum. At frequencies f smaller than $f_r$ (range I), the capacitive load is provided. Frequencies higher than $f_r$ (range II), however, correspond to states of converter operation with in inductive converter load. Accordingly, the converter is to be operated at frequencies f above the resonance frequency $f_r$. It will be evident from FIG. 6 that the capacitive mode of operation (range I) should also be avoided because the control mechanisms customarily used for controlling the converter output voltage U2 no longer react. In contrast to the range II, the value of A(f) decreases with a decreasing frequency in the range 1 so that there is a positive feedback, preventing control of the output voltage U2, instead of a negative feedback as in range II (increasing values of A(f) with a decreasing frequency f).

The invention claimed is:

1. A circuit arrangement for a converter with switches for chopping an input DC voltage into a chopped DC voltage, comprising
control means for controlling the switch-on times of the switches, in which switch-on times of the switches alternate with each other and are separated from each other by dead-time phases, and
circuit elements comprising a resonant circuit having at east one capacitor and at least one coil for converting the chopped DC voltage into an output voltage,
wherein:
means for determining current flowing in the resonant circuit are provided,
the control means include a comparator that compares a value dependent on the current flowing in the resonant circuit with a threshold value, and
the circuit means control the switching of the switches in dependence upon the comparison result to control the dead-time phases.

2. The circuit arrangement of claim 1, wherein:
means for determining a current gradient of the current flowing in the resonant circuit are provided, and
the comparator compares a value dependent on the current gradient with the threshold value.

3. The circuit arrangement of claim 1, wherein the means for determining the current and/or the current gradient are provided in the resonant circuit.

4. The circuit arrangement of claim 1, wherein the means for determining the current and/or the current gradient are provided on each switch.

5. The circuit arrangement in of claim 1, wherein the means for determining the current and/or the current gradient include at least a resistor.

6. The circuit arrangement of claim 1, wherein the means for determining the current and/or the current gradient include at least a current transformer.

7. The circuit arrangement of claim 1, wherein the means for determining the current and/or the current gradient include at least a current-sense FET.

8. The circuit arrangement of claim 1, wherein MOSFETs are used as switches, and
the current and/or the current gradient is determined via the drain-source voltage at the MOSFETs.

9. A method of controlling a pair of switches in a switching converter that provide a chopped DC voltage that is coupled to a resonant circuit, the method comprising:
determining a measure of energy in the resonant circuit, and
determining a phase at which to close each switch so as to achieve substantialty zero voltage switching at each switch, based on the measure of energy in the resonant circuit, and
controlling each switch based on each determined phase.

10. The method of claim 9, wherein:
determining the measure of enemy includes:
determining a value dependent on current flowing in the resonant circuit, and
comparing the value with a threshold value during a switch-on phase of each switch of the pair; and
controlling each switch includes alternately switching the switches off until the current has reached the threshold value.

11. The method of claim 10, including
opening each switch at or before the threshold value is reached.

12. The method of claim 10, including
preventing a switch-on of each switch after exceeding or falling below the threshold value.

13. The method of claim 10, including
adjusting the threshold value in dependence upon the input DC voltage, wherein the threshold value is raised with an increasing input DC voltage.

14. The method of claim 9, wherein:
detemilninci the measure of energy includes:

determining a value dependent on a current gradient of the current flowing in the resonant circuit, and comparing the value to a threshold value during a switch-on phase of each switch; and controlling each switch includes alternately switching the switches off until the current gradient has reached the threshold value.

15. The method of claim 9, wherein switch-on intervals during which each switch is closed alternate with each other and are separated from each other by dead-time phases, and controiling each switch includes controlling the dead-time phases between switch-on intervals in the switching converter.

16. A resonant converter comprising:

a pair of switches that are configured to produce a chopped DC voltage from an input voltage, a resonant circuit that is configured to produce an output voltage from the chopped DC voltage, a control circuit that is configured to control the switches based on a measure of energy in the resonant circuit, wherein each switch is independentiy controlled by the control circuit, and the control circuit is configured to control each turn-on phase of each switch to achieve substantially zero voltage switching at each switch based on the measure of energy in the resonant circuit.

17. The resonant converter of claim 16, wherein the control circuit includes a pair of phase controllers, each phase controller being configured to provide:

a first control signal that signals when a switch of the pair may be switched off, and a second control signal that signals when an other switch of the pair may be switched on.

18. The resonant converter of claim 17, wherein the control circuit includes a frequency controller that is configured to control a frequency of switching the pair of switches to control the output voltage.

19. The resonant converter of claim 18, wherein the control circuit includes a bridge controller that is configured to switch the pair of switches:

at the frequency of switching controlled by the frequency controller, and at the turn-on phases controlled by the phase controllers.

20. The resonant converter of claim 17, wherein each phase controller includes:

an estimator that is configured to determine the measure of energy based on one or more measures of current flow, and a comparator that is configured to compare the measure of energy to a threshold value to provide the second control signal.

21. The resonant converter of claim 20, wherein each phase controller includes a threshold controller that is configured to adjust the threshold value based on a measure of the input voltage.

* * * * *